United States Patent
Johnson

(10) Patent No.: US 9,423,289 B2
(45) Date of Patent: Aug. 23, 2016

(54) LOAD CELL SUPPORT STRUCTURE FOR A WEIGHT SCALE

(71) Applicant: ILLINOIS TOOL WORKS INC., Glenview, IL (US)

(72) Inventor: Thomas H. Johnson, Winnebago, MN (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 283 days.

(21) Appl. No.: 13/841,441

(22) Filed: Mar. 15, 2013

(65) Prior Publication Data

US 2014/0262558 A1   Sep. 18, 2014

(51) Int. Cl.
G01G 3/14       (2006.01)
G01G 21/18      (2006.01)
G01G 23/00      (2006.01)
G01G 21/23      (2006.01)

(52) U.S. Cl.
CPC ............... G01G 3/14 (2013.01); G01G 23/005 (2013.01); G01G 21/18 (2013.01); G01G 21/23 (2013.01)

(58) Field of Classification Search
CPC ..... G01G 21/18; G01G 21/184; G01G 21/23; G01G 21/235; G01G 3/14; G01G 23/005; Y10S 177/09
USPC ..................................... 177/DIG. 9
See application file for complete search history.

(56) References Cited

U.S. PATENT DOCUMENTS

| 4,094,368 | A | 6/1978 | Sann et al. |
| 4,611,677 | A | 9/1986 | Yu |
| 5,600,104 | A * | 2/1997 | McCauley et al. ............ 177/136 |
| 7,005,587 | B2 | 2/2006 | Axakov et al. |
| 7,361,852 | B2 * | 4/2008 | Leahy et al. .................. 177/229 |
| 2003/0213623 | A1 | 11/2003 | Axakov et al. |

FOREIGN PATENT DOCUMENTS

| DE | 2933415 A1 | 4/1980 |
| DE | 10161517 A1 | 7/2003 |
| EP | 1476736 A1 | 11/2004 |
| WO | 03071246 A1 | 8/2003 |

OTHER PUBLICATIONS

"IQ plus® 2100 Digital Bench Scale", Rice Lake Weighing Systems (2012).
"Viper scales", Mettler Toledo Inc. (2000).
ISR for PCT/US2014/020004 mailed May 23, 2014.

* cited by examiner

Primary Examiner — Randy W Gibson
(74) Attorney, Agent, or Firm — Hauptman Ham, LLP

(57) ABSTRACT

A load cell support structure includes a base support member; a load bearing member movable with respect to the base support member and having an upper surface for receiving a load; a load cell engaging member adapted to operatively engage at least one load cell; a load transfer portion integrally formed with the load bearing member and operatively coupled to the load cell engaging member so as to transfer a load from the upper surface to at least one load cell via the load cell engaging member; at least one biasing member adapted to urge the load transfer member towards the load cell engaging member; and at least one pivot member operatively engaging the load transfer member and the load cell engaging member so as to allow pivotal movement of the load transfer member with respect to the load cell engaging member about the pivot member.

24 Claims, 9 Drawing Sheets

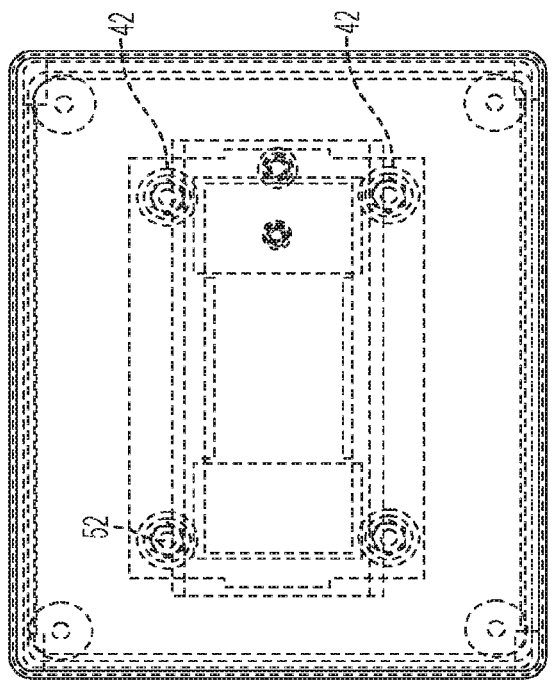
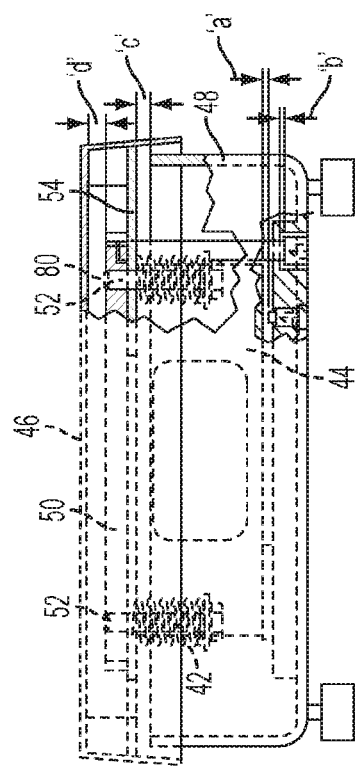
FIG. 2
PRIOR ART

LOAD CELL SUPPORT STRUCTURE FOR A WEIGHT SCALE

The present invention relates generally to the field of load cell overload protection, and in particular to spring preloaded load cell support structures suitable for use in weighing scales.

INTRODUCTION

Scales are devices that are used to determine the weight of an object by measuring the gravitational pull of the Earths gravitational field exerted on that object. Scales are widely used to measure weight at a wide range of precision. For example, some measurements may require a very high accuracy in the region of +/−1 Nano grams or even lower (industry standard scales), whereas other measurements may only require an accuracy of +/−100 grams (e.g. body weight scales). Today, many digital weighing scales use load cells to determine the weight of an object.

A load cell is a transducer adapted to convert a force into a corresponding electrical signal. In particular, a force may cause a deformation of the transducer (e.g. bending, compressing, tension or torsion) which is measured by an attached strain gauge (change of electrical resistance in response to deformation). Load cells come in various types such as bending or shear beam load cells, compression load cells such as S-type load cells or multi-column load cells and ring torsion load cells. Such load cells may be damaged because of (shock) overloading, lightning strikes or heavy surges in current, chemical or moisture ingress, mishandling (dropping, lifting on cable, etc.), vibration, seismic events or internal component malfunctioning.

It is clear that it is particularly important to protect any load cell from overload to prevent any damage to the load cell.

For example, present scales that utilize load cells may provide deflection limiting gaps to prevent overloads from damaging the force sensor (i.e. load cell). These gaps may be provided between the force sensor and the support structure to protect it from centred overload conditions. These gaps may also be used at the corners of a load bearing structure platform to protect it from excessive eccentric loads. The gaps may be dimensioned such that the gap is closed before the magnitude of an applied load can damage the load cell or force sensor. Some scale types may use an arrangement of preloaded springs to support the load placed on the scale and absorb impact energy and reduce peak forces (if required), therefore allowing larger dimensioned gaps at the corners of a scale.

FIG. 1 shows a first example of a known scale 10 which includes a support structure (i.e. housing and load bearing platform) utilizing deflection limiting gaps 'a', 'b', 'c1' to 'c4. The gap 'a' (directly under a load cell 20) is dimensioned such as to protect the load cell 20 from forces exceeding the overload capacity of the scale 10. The gap 'b' is dimensioned such as to protect the load cell 20 from forces opposite the direction of a load applied to the load bearing platform 30. Gaps 'c1' to 'c4' (near a corner region of the scale 10) are dimensioned such as to limit eccentric loads (i.e. eccentric from the centre point of the load bearing platform 30) that could damage the load cell 20.

FIG. 2 shows a second example of a known scale 40 which includes a support structure (i.e. housing and load bearing platform) utilizing deflection limiting gaps 'a' and 'b', as well as clearance gaps 'c' and 'd', and preloading springs 42. The gap 'a' (directly under a load cell 44) is dimensioned such as to protect the load cell 44 from forces exceeding the overload capacity of the scale 40. The gap 'b' is dimensioned such as to protect the load cell 44 from forces opposite the direction of a load applied to the load bearing platform 46. The gap at 'c' (between the load bearing platform 46 and the supporting housing 48 of the scale 40) must be less than the gap at 'd'. Gap 'c' closes when the preload of the springs 42 is exceeded and a gap (not shown) opens between a load cell engaging plate 50, securing the spring preload bolts 52, and a load transfer portion 54 that is preloaded by the preloading springs 42, therefore limiting eccentric loads that could potentially damage the load cell 44. The spring preload bolts 52 are attached within the plane defined by the edges of the load cell engaging plate 50, and this arrangement subsequently limits the ratio between the load-exceeding centre release forces (loads placed in a centre region of the load bearing platform 46 so as to engage all preloading springs 42) and eccentric release forces (loads placed outside a centre region of the load bearing platform 46).

However, currently available scales, such as described in FIGS. 1 and 2, do not sufficiently prevent low frequency vibration of the scale after loading, since the force sensors are usually very stiff and therefore deflect very little under load. The protection gaps of such scales are dimensioned on a very small range, which is difficult to adjust at a sufficient accuracy. In order to dimension the gaps correctly, test-loads must be applied to the scale to set the gaps, taking much time and effort.

Furthermore, the gaps may also be dependent on ridged structures comprised within the scale to enable the gap to be a force limiting means when contact is made. When the forces applied on the scale exceed even higher levels, once the gap closes, the ridged structure may not prevent the load cell from being further deflected and potentially damaged.

In addition, excessive eccentric loads, which are applied off-centre from the load cell, are particularly difficult to limit consistently and accurately enough, due to deflections within the support structure of the scale as well as the supporting surface the scale rests on. Also, scales utilizing preloaded spring support structures of the load supporting platform provide an unpredictable stability and/or a very inaccurate limitation range for off-centre loads, making low frequency vibration a real problem. Furthermore, currently available force-limiting means (e.g. gaps) can only function in the direction of the fundamental force sensitivity of the scale (i.e. load cell) and do not prevent any potentially damaging forces from other directions.

SUMMARY OF THE INVENTION

Preferred embodiment(s) of the invention seek to overcome one or more of the above disadvantages of the prior art.

According to a first aspect of the invention there is provided a load cell support structure for a scale comprising:

a base support member for mounting at least one load cell;

a load bearing member movable with respect to said base support member and having an upper surface for receiving a load;

a load cell engaging member adapted to operatively engage at least one load cell in a direction of a load applied to said upper surface of said load bearing member;

a load transfer portion integrally formed with said load bearing member and operatively coupled to said load cell engaging member so as to transfer a load from said upper surface to at least one load cell via said load cell engaging member;

at least one biasing member adapted to urge said load transfer member towards said load cell engaging member with a predetermined biasing force and in a direction opposing a load applied to said upper surface of said load bearing member;

at least one pivot member operatively engaging said load transfer member and said load cell engaging member, so as to allow pivotal movement of said load transfer member with respect to said load cell engaging member about said pivot member and in at least one plane parallel to the direction of a load applied to said upper surface.

This provides the advantage that, in addition to any available centre deflection limiting gaps and preloading springs (see prior art FIGS. 1 and 2), the pivotal movability between the load cell engaging member and the load transfer portion (as well as the load bearing member) about the least one pivot member, allows the at least one biasing member (e.g. preloading spring) to be arranged at variable locations and provides highly accurate and predictable load release conditions. As well as, a very stable scale operation up to the predetermined maximum overload release load (i.e. force) condition.

Advantageously, the load cell support structure may comprise a plurality of biasing members positioned about a centre point and in a symmetrical arrangement with respect to a centre axis of said upper surface within a region of said load transfer portion. Typically the load cell support structure may comprise a plurality of pivot members positioned in a symmetrical arrangement about a centre point of said upper surface. Preferably, the load cell support structure may comprise a plurality of pivot members positioned in a symmetrical arrangement about said centre point of said upper surface at a predetermined distance from said centre point.

Advantageously, the spatial arrangement of said plurality pivot members with respect to said centre point of said upper surface and with respect to any one of said plurality of biasing members may determine a minimum load required at any position on said upper surface to overcome a biasing force provided by said at least one biasing member.

This provides the advantage that, because a spring element (biasing member) is preloaded against a structure with pivot members, the line of force of the preloading spring element (biasing member) is within the limits of the pivot members. Therefore, the maximum preload of the spring element defines the central release force that, when exceeded, allows the load to deflect at the spring rate (spring constant) of the preloading springs (biasing members) much less than the load cell spring rate (spring constant). For example, a gap between the base support member of the scale and the load bearing member closes as the load deflects at the preload spring rate. Any further increase of load applied to the load cell is prevented once the gap closes (such as described in prior art scales). However, in the present invention, the release force is reduced when a force is applied to the upper surface of the load bearing member so that its centre of action is outside of the limits of the pivot members. Furthermore, in the present invention, the preloading springs (biasing members) may be positioned outside of the pivot limits, allowing greater design flexibility in limiting the overall height of a scale assembly and further utilization of space within the scale housing, while, at the same time, accurately limiting forces transferred to the load cell.

Preferably, the at least one pivot member may be any one of a ball bearing, a pin, a chamfered surface and a rounded button, each one adapted to allow pivotal movement between said load cell engaging member and said load transfer portion.

The at least one pivot member may be a pivot column having any one of a flat, spherical, ellipsoidal and chamfered cross section, each one adapted to allow pivotal movement between said load cell engaging member and said load transfer portion. Preferably, the at least one biasing member may be a compression spring.

Advantageously, the at least one pivot member(s) may be adapted to move relative to said load cell engaging member and/or relative to said load transfer member in a direction parallel to said upper surface.

The movement of said pivot member may be limited by a corresponding pivot member engaging recess provided in said load cell engaging member and/or load transfer member. Preferably, the movement of said pivot member may be limited by a stop provided on said load bearing member and adapted to stoppably engage with a portion of said base support member. Even more preferably, the movement of said pivot member may be limited by at least one stop member provided on said load bearing member and adapted to stoppably engage with a portion of said base support member.

This provides the further advantage that lateral (e.g. horizontal) movement is allowed when side loads exceed the tangent component of the preload force limiting side load forces assumed that stop gaps are also present in the direction perpendicular to the direction of force measurement. The movement of the pivot members may be limited (restricted) by tapered cups (or any other recesses) suitable to receive the pivot members.

According to a second aspect of the invention there is provided a load cell scale having a load cell support structure comprising:

a base support member for mounting at least one load cell;

a load bearing member movable with respect to said base support member and having an upper surface for receiving a load;

a load cell engaging member adapted to operatively engage at least one load cell in a direction of a load applied to said upper surface of said load bearing member;

a load transfer portion integrally formed with said load bearing member and operatively coupled to said load cell engaging member so as to transfer a load from said upper surface to at least one load cell via said load cell engaging member;

at least one biasing member adapted to urge said load transfer member towards said load cell engaging member with a predetermined biasing force and in a direction opposing a load applied to said upper surface of said load bearing member;

at least one pivot member operatively engaging said load transfer member and said load cell engaging member, so as to allow pivotal movement of said load transfer member with respect to said load cell engaging member about said pivot member and in at least one plane parallel to the direction of a load applied to said upper surface.

The load cell support structure may be according to any variation of the first aspect of the present invention.

Throughout the description and claims of this specification, the words "comprise" and "contain" and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

BRIEF DESCRIPTION OF THE DRAWINGS

Preferred embodiments of the present invention will now be described, by way of example only and not in any limitative sense, with reference to the accompanying drawings, in which:

FIG. 2 shows a known scale utilizing limiting gaps and preloading springs to protect the load cell from overload;

DETAILED DESCRIPTION OF THE PREFERRED EMBODIMENT(S)

The exemplary embodiments of this invention will be described in relation to weighing scales. However, it should be appreciated that, in general, the support structure may be applied to any other suitable load cell application.

Figure 3:
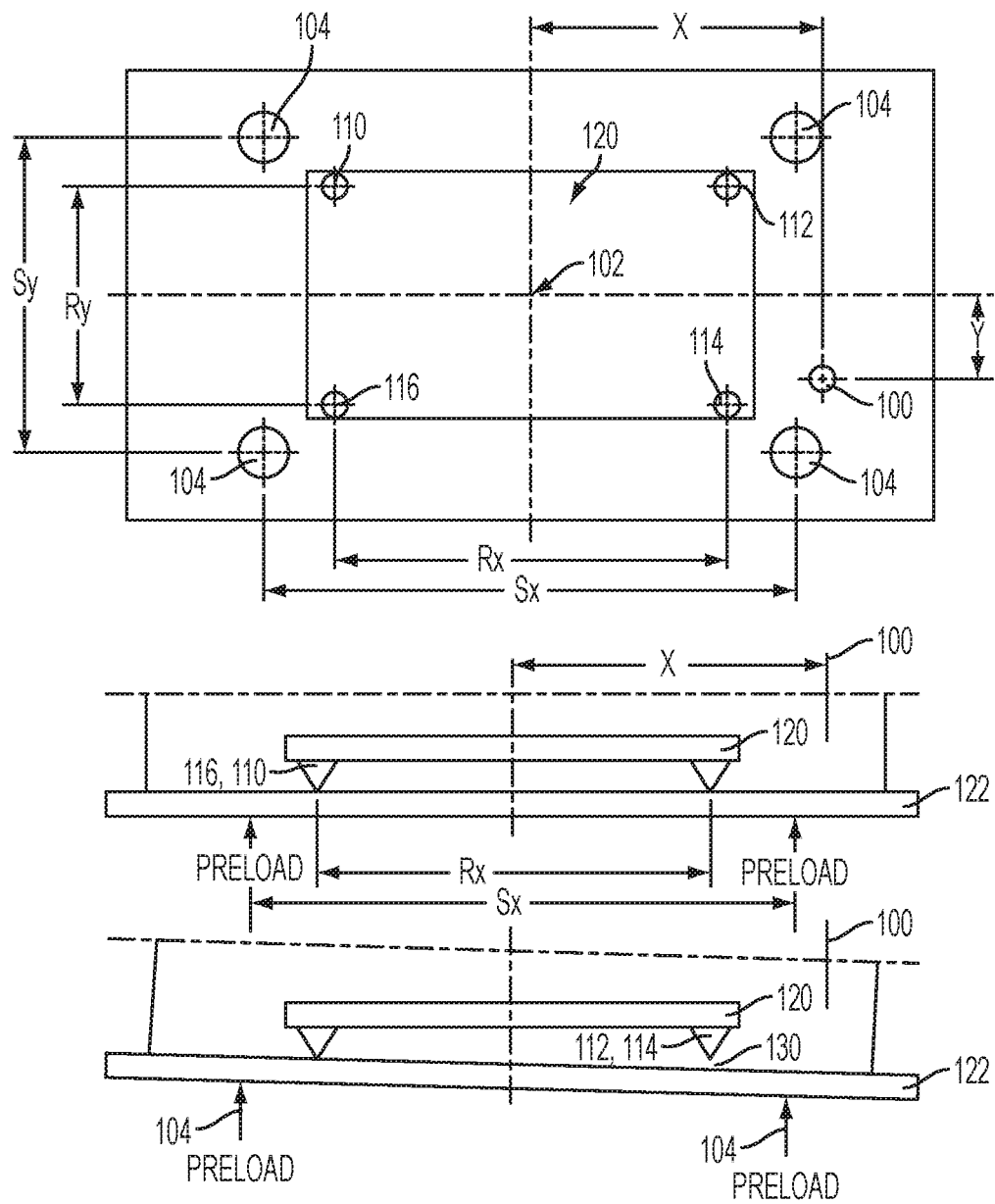
FIG. 3 shows a schematic diagram of the function of the present invention particularly showing the leverage effect when using pivot members at a four spring arrangement.
Figure 4:
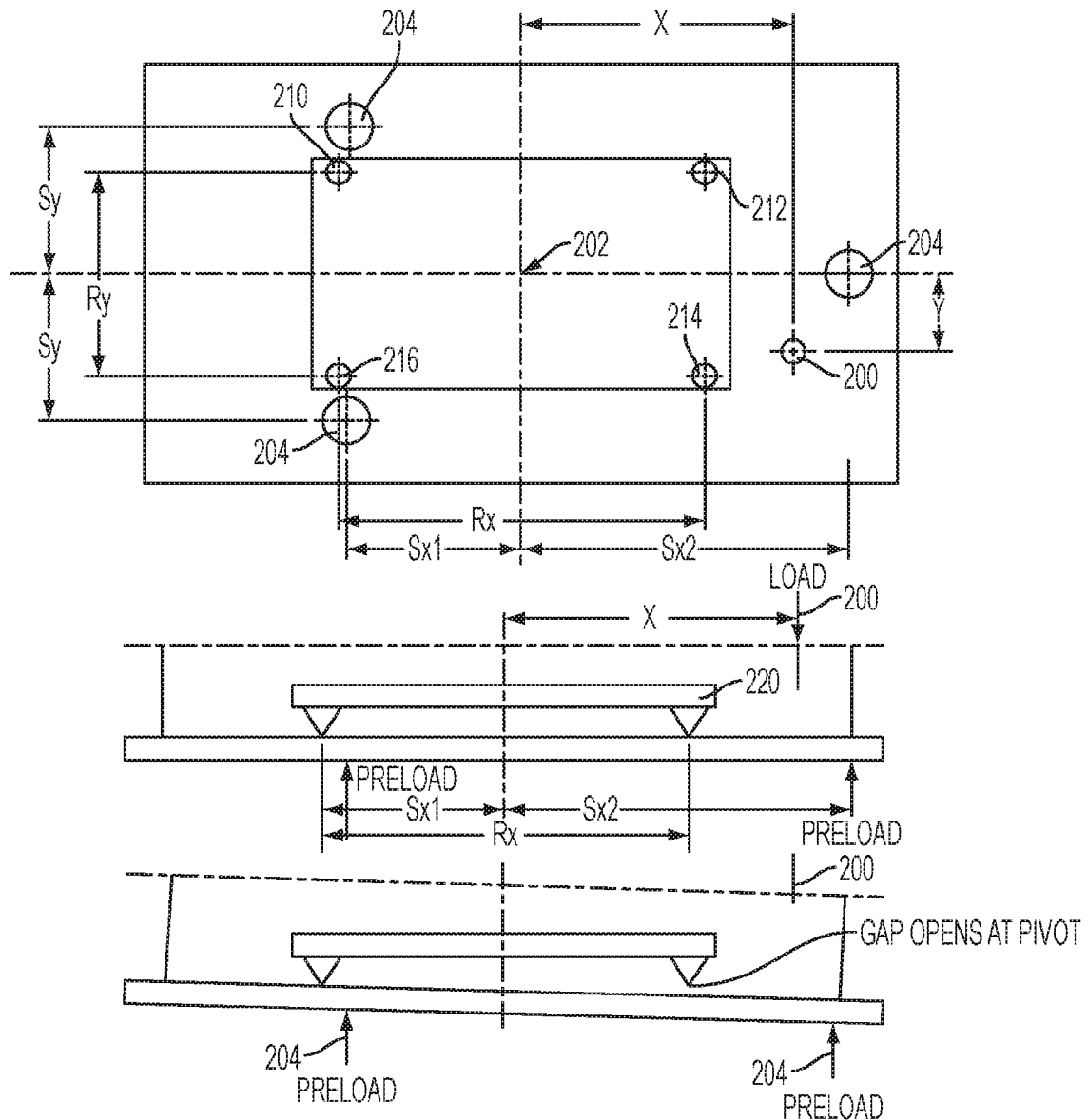
FIG. 4 shows a schematic diagram of the function of the present invention particularly showing the leverage effect when using pivot members at a three spring arrangement.

The basic principle and mechanism of the invention is explained on two simplified examples (i.e. four-spring arrangement and three-spring arrangement) as shown in schematic diagrams of FIG. 3 and FIG. 4. The diagram shown in FIG. 3 (four-spring arrangement) indicates the relative position of the applied load 100 to the centre of force, due to symmetrically oriented preloads 104 (i.e. springs), located at the centre 102 of the rectangular support platform 120 (also known as the load cell engaging platform), at "x, y" coordinates. The x-coordinate of the centre of force can be defined as the sum of the moments about the y-axis divided by the sum of the total force, and the y-coordinate of the centre of force can be defined as the sum of the moments about the x-axis divided by the sum of the total force.

$$X_{total\ preload} = \Sigma F_i \cdot x_i / \Sigma F_i \quad [\text{Eq. 1}]$$

$$Y_{total\ preload} = \Sigma F_i \cdot y_i / \Sigma F_i \quad [\text{Eq. 2}]$$

The four pivot locations 110, 112, 114, 116 are symmetrically oriented relative to the support platform 120 with spacing of "Rx" in the x-direction and "Ry" in the y-direction. When the four preload forces of the preloads 104 are equal, the spring locations are symmetrically oriented relative to the support platform 120 with spacing of "Lx" in the x-direction and "Ly" in the y-direction. A gap 130 will open between the load bearing structure 122 and the pivot (114 in this particular example) nearest the applied load 100, when the total moment due to the applied load 100 about the pivot farthest from it (110 in this particular example), exceeds the total moment due to the total preload load about the same pivot 110. This gap 130 will increase with the applied load 100 until the load bearing structure 122 contacts the support base (not shown in this example) in the scale (not shown in this example).

The diagram shown in FIG. 4 (three-spring arrangement) indicates the relative position of applied load 200 to the centre of force, due to the asymmetrically oriented preloads 204 (i.e. springs), located at the centre 202 of the rectangular support platform 220 (i.e. the load cell engaging platform), at "x, y". The x-coordinate of the centre of force can be defined as the sum of the moments about the y-axis divided by the sum of the total force and the y-coordinate of the centre of force can be defined as the sum of the moments about the x-axis divided by the sum of the total force.

$$X_{total\ preload} = F_{preload} \cdot (S_{x2} - 2 \cdot S_{x1}) / 3 \cdot F_{preload} \quad [\text{Eq. 3}]$$

$$Y_{total\ preload} = F_{preload} \cdot (S_y - S_y + 0) / 3 \cdot F_{preload} \quad [\text{Eq. 4}]$$

The four pivot locations 210, 212, 214, 216 are symmetrically oriented relative to the support platform 220 with spacing of "Rx" in the x-direction and "Ry" in the y-direction. When the three preload forces of the preloads 204 (i.e. springs) are equal, the spring locations are asymmetrically oriented relative to the support platform 220 spaced at "Sx1" and the at "Sx2" along the x-direction from the centre 202, and the two off-centre preloads 204 spaced at "Sy" along the y-direction from the centre 202, and the third preload 204 being on the x-axis in the y-direction. In this particular example, the spacing "Sx2" is twice the spacing "Sx1", when the total centre of preload force is at the centre 202 of the support platform 220.

Figure 1:
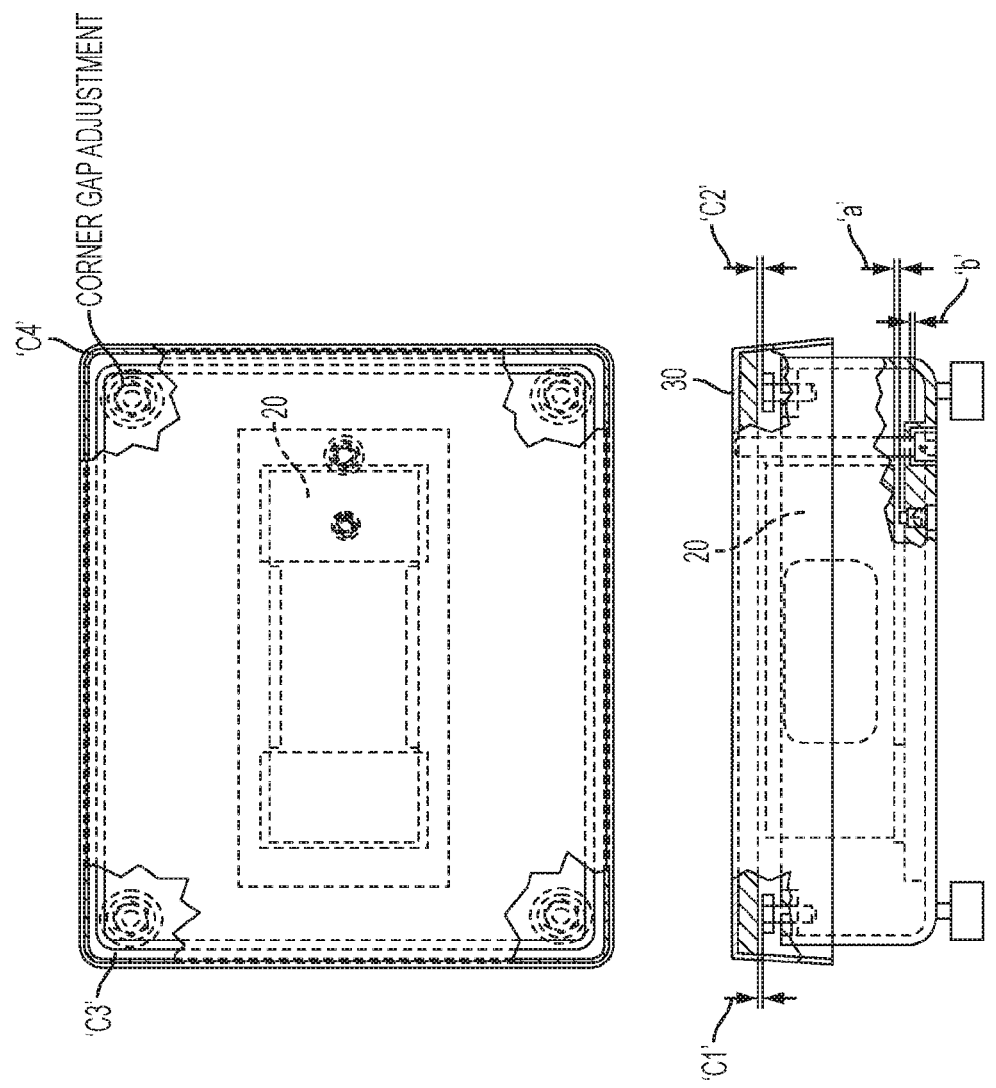
FIG. 1 shows a known scale utilizing limiting gaps to protect the load cell from overload.
Figure 5:
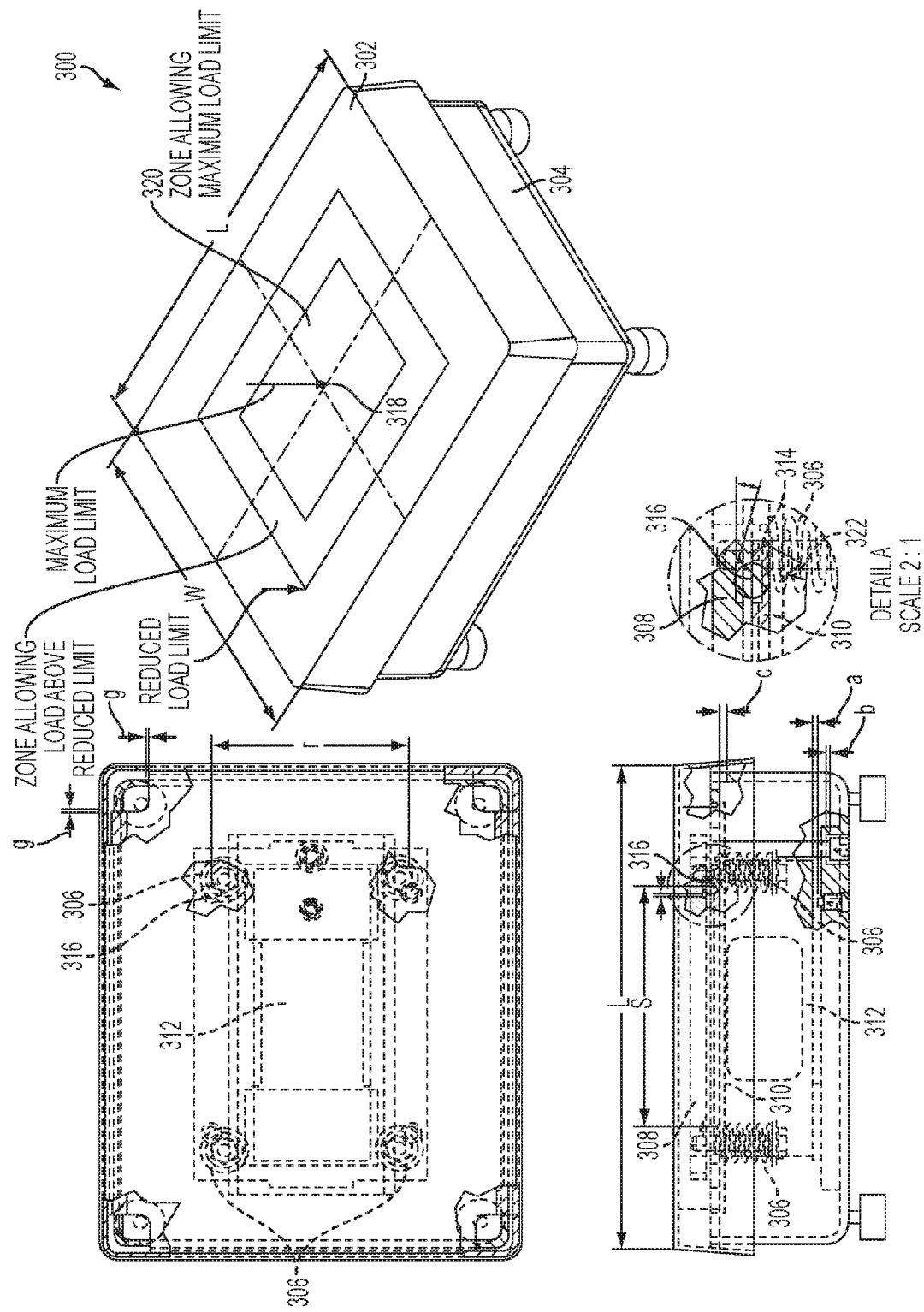
FIG. 5 shows a top, front and perspective view of a typical example of a first embodiment of the present invention utilizing pivot members (i.e. balls)
Figure 6:
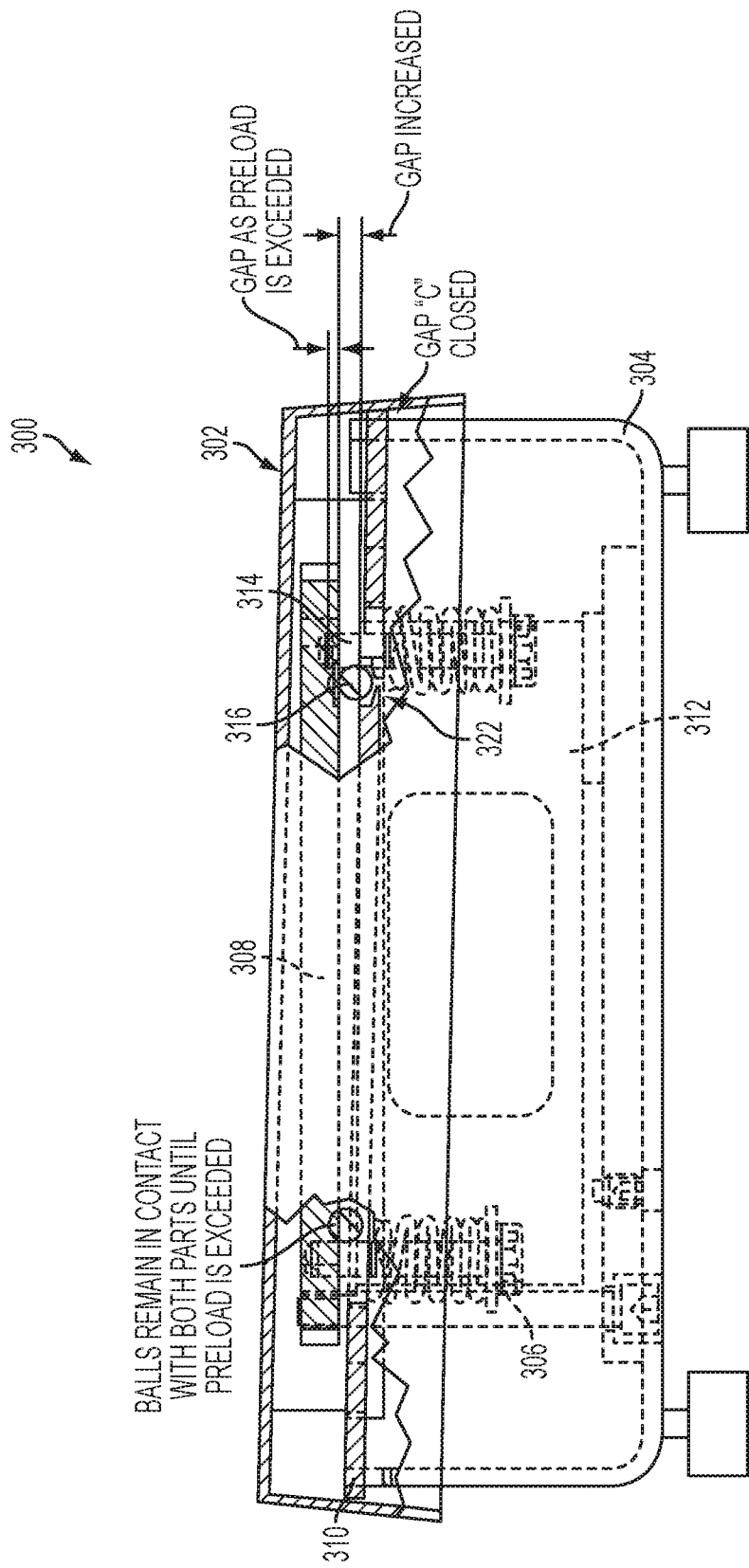
FIG. 6 shows a side view of the scale of FIG. 5 at a state at off-centre load release.
Figure 7:
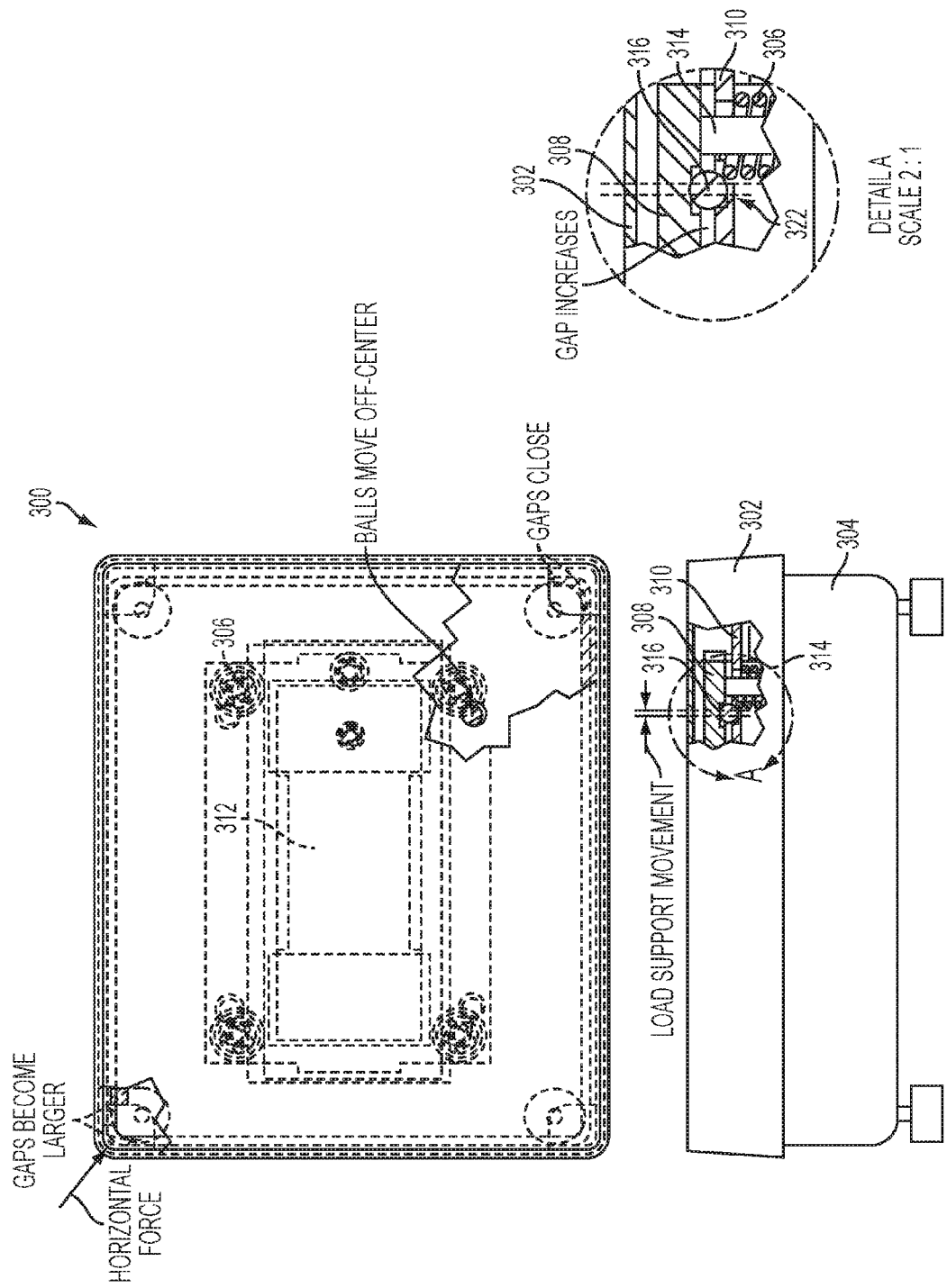
FIG. 7 shows the scale of FIG. 5 with the pivot members in a side release state (i.e. lateral movement)

Referring now to FIGS. 5 to 7, a preferred embodiment of a weighing scale 300 incorporating the present invention is provided with adjusted deflection limiting gaps 'a' and 'b' as well as clearance gaps 'c' and 'd' and 'g'. The gaps at 'a' and 'b' are dimensioned according to known scales (see FIGS. 1 and 2). The gap at 'c' (between the load bearing structure 302 and the supporting base 304 of the scale 300) must be less than the gap at 'd'. Gap 'c' closes when the preload of the springs 306 is exceeded and a gap (not shown) opens between the structure 308 securing the spring preload bolts (i.e. the load cell engaging platform) and the structure 310 preloaded by the preloaded springs (i.e. the load transfer platform), limiting eccentric loads that would damage the load cell 312.

The bolts 314 are attached to the bolt securing structure 308 with pivot elements 316 that can be anywhere, not limiting the ratio between the load exceeding centre release forces and eccentric release forces.

The force over the centre 318 of preload force must exceed the total force on all of the preload springs 306 before the load bearing structure 302 begins vertical movement away from the bolt securing structure 308. The maximum overload on the scale 300, in the centre zone 320, is the total preload force plus the total spring constant times the gap 'c'.

$$F_{max} = F_{Total\ preload} + K_{total} \cdot c \quad [\text{Eq. 5}]$$

The force not centred over the centre of preload force must exceed only a fraction 'R' of the total force on all of the preload springs 306 before the load bearing structure 302 begins vertical movement away from the bolt securing structure 308. The maximum off-centre overload on the scale 300 is the maximum overload on the scale times the fraction 'R'.

$$F_{max\ off\text{-}centre} = F_{max} \cdot R \quad [\text{Eq. 6}]$$

When the gap 'c' closes nearest the off-centre centre-of-force on the scale 300, the torque or moment placed on the load cell 312 is limited. The force on the load cell 312 continues to increase but the moment does not until the gap 'c' closes in at least two locations on opposite sides from the centre of force, limiting the maximum force to the maximum centre-load-force on the load cell 312 with a moment of zero. The horizontal gaps 'g' (between the load bearing structure 302 and the supporting base 304), near the outer edges and corners of the scale 300, limit the side loads that can be transferred to the load cell 312. These gaps may be a horizontal gap between any part of the load bearing structure 302 and the supporting base 304 such as the gap between a column and a hole in some configurations. The preloaded pivots 316 move in the cups 322 with chamfered pockets until gaps 'g' close. The side force limit is reduced as the angle of the pocket chamfers is reduced. The pivots 316 may be rounded buttons or even chamfered elements or balls, or any other form that is suitable to provide a pivot point. Pivoting columns may be used instead of balls when space is limited. These columns can have spherical, ellipsoidal, flat, or chamfer ends.

Figure 8:
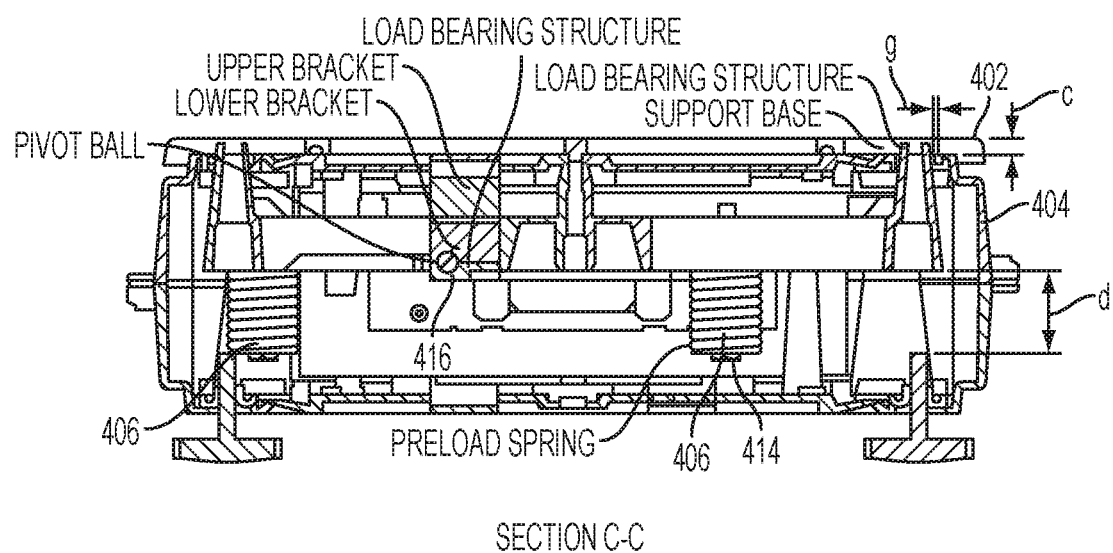
FIG. 8 shows an example of a second embodiment of the present invention of a top mounted load cell with hole clearance side stops.

Referring to FIG. 8, an example of a second embodiment is shown where the scale 400 is built with adjusted deflection limiting gaps 'a' and 'b' as well as clearance gaps 'c' and 'd' and 'g'. The gaps at 'a' and 'b' are dimensioned according to known scales (see FIGS. 1 and 2), but are located between brackets attached to the upper portion of the ends of the load cell. The gap at 'c' (between the entire lower surface of the load bearing structure 402 and the supporting base 404 of the scale 400) must be less than the gap at 'd' between the load bearing structure 402, but 'd' is between the lower portion of the load bearing structure 402 and the lower portion of the base 404, which is very large. The limits in this configuration are only limited by the compression of the springs 406 to a solid state. The gap between the load bearing structure 402 and the base 404, i.e. 'c', closes when the preload of the springs 406 is exceeded and a gap opens between the structure securing the spring preload bolts (i.e. the load cell engaging structure) and the load bearing structure 402 preloaded by the preloaded springs 406, limiting eccentric loads that would cause torsional stress that would damage the load cell. The bolts 414 are attached to the bolt securing lower load cell bracket compressing the preload springs 406 and preloading the pivot elements 416 (balls) between the load bearing structure 402 and the lower load cell bracket. The location of the balls 416, relative to the centre of the total preload force, defines the ratio between the load exceeding centre release forces and eccentric release forces. This configuration utilizes only three preload springs 406 with the centre of preload force under the centre of the scale 400. The three spring configurations allows the upper and lower load cell brackets to be identical, with one inverted and nesting with the other. The preload spring bolt securing holes are used as through holes for attachment to the upper base. The horizontal gaps 'g' (between the load bearing structure 402 and the supporting base 404) are horizontal gaps between columns on the load bearing structure 402 and holes in the upper portion of the support base 404.

Figure 9:
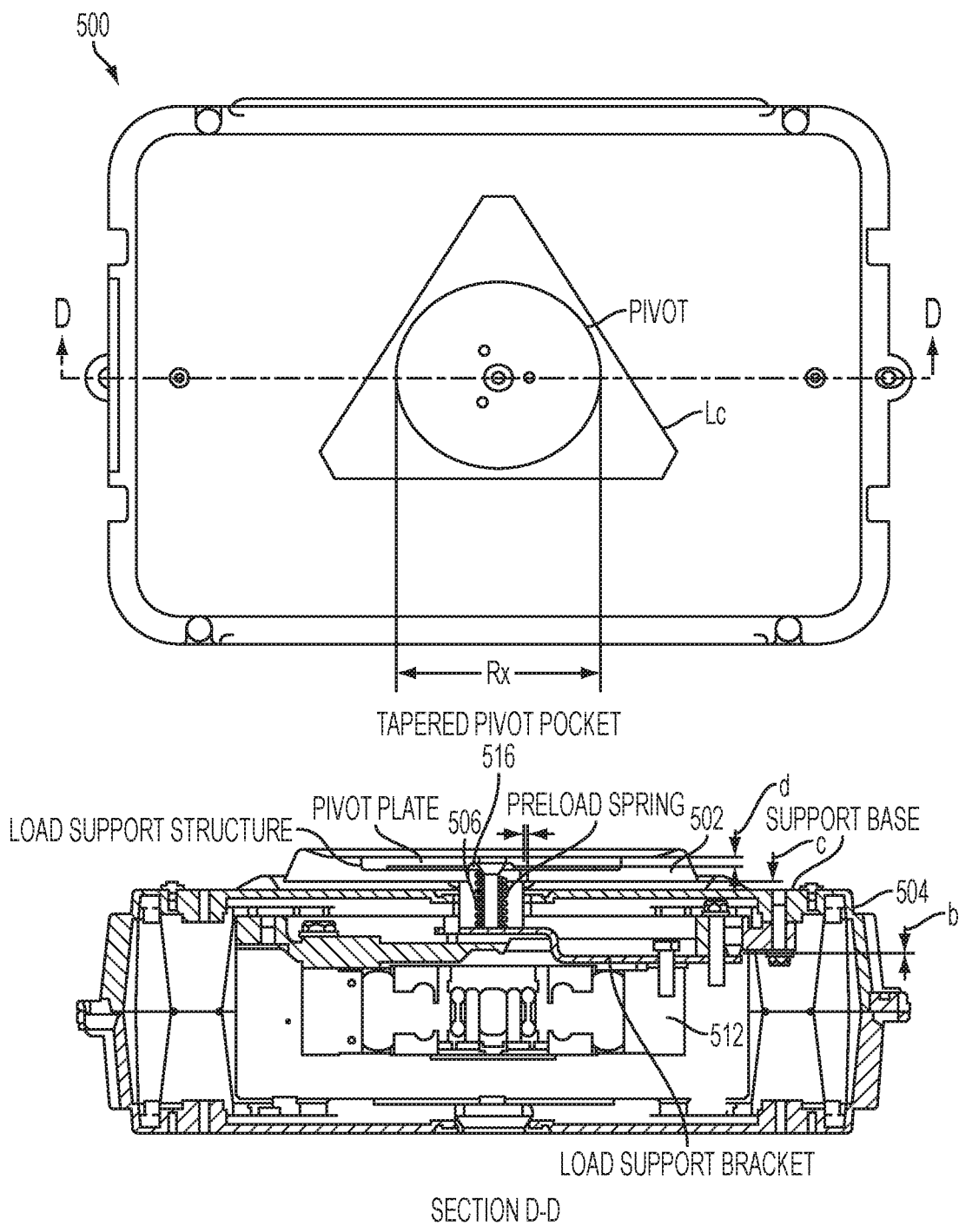
FIG. 9 shows an example of a third embodiment of the present invention utilizing a one-spring arrangement and a circular pivot edge with a tapered hole alignment.

Referring now to FIG. 9, an example of a third embodiment is shown, where the scale 500 is built with adjusted deflection limiting gaps 'a' and 'b' as well as clearance gaps 'c' and 'd' and 'g'. The gaps at 'a' and 'b' are dimensioned according to known scales (see FIGS. 1 and 2), but are located between brackets attached to the upper portion of the ends of the load cell 512. The gap at 'c' (between the outer edge of the load bearing structure 502 and the supporting base 504 of the scale 500) must be less than the gap at 'd' between the load bearing structure 502. The gap between the load bearing structure 502 and the base 504, i.e. 'c', closes when the preload of the spring 506 is exceeded and a gap opens between the bolt and the load bearing structure 502 preloaded by the preloaded spring 506, limiting eccentric loads that would cause torsional stress that would damage the load cell 512. The bolt is attached to upper load cell bracket compressing the preload spring 506 and preloading the pivot element (disk) 516 between the load bearing structure 502 and the bolt attached to the upper load cell bracket. The diameter of the disk 516, centred on the centre of total preload force, defines the ratio between the load exceeding centre release forces and eccentric release forces. This configuration utilizes only one preload spring 506 with the centre of preload force under the centre of the scale 500. The horizontal gap 'g' (between the load bearing structure 502 and the supporting base 504) is a horizontal gap between the centre load bearing column in the load bearing structure 502 and the hole in the upper portion of the support base 504.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A load cell support structure for a scale comprising:
    a base support member for mounting at least one load cell;
    a load bearing member movable with respect to said base support member and having an upper surface for receiving a load;
    a load cell engaging member adapted to operatively engage at least one load cell in a direction of a load applied to said upper surface of said load bearing member;
    a load transfer portion integrally formed with said load bearing member and operatively coupled to said load cell engaging member so as to transfer a load from said upper surface to at least one load cell via said load cell engaging member;
    at least one biasing member adapted to urge said load transfer member towards said load cell engaging member with a predetermined biasing force and in a direction opposing a load applied to said upper surface of said load bearing member;
    at least one pivot member operatively engaging said load transfer member and said load cell engaging member, so as to allow pivotal movement of said load transfer member with respect to said load cell engaging member about said pivot member and in at least one plane parallel to the direction of a load applied to said upper surface, wherein the load cell support structure is configured such that deflection of the load bearing member downward due to loading reduces a load on the at least one pivot member.

2. A load cell support structure according to claim 1, comprising a plurality of biasing members positioned about a centre point and in a symmetrical arrangement with respect to a centre axis of said upper surface within a region of said load transfer portion.

3. A load cell support structure according to claim 1, comprising a plurality of pivot members positioned in a symmetrical arrangement about a centre point of said upper surface.

4. A load cell support structure according to claim 2, comprising a plurality of pivot members positioned in a symmetrical arrangement about said centre point of said upper surface at a predetermined distance from said centre point.

5. A load cell support structure according to claim 4, wherein the spatial arrangement of said plurality pivot members with respect to said centre point of said upper surface and with respect to any one of said plurality of biasing members determines a minimum load required at any position on said upper surface to overcome a biasing force provided by said at least one biasing member.

6. A load cell support structure according to claim 1, wherein said at least one pivot member is any one of a ball bearing, a pin, a chamfered surface and a rounded button, each one adapted to allow pivotal movement between said load cell engaging member and said load transfer portion.

7. A load cell support structure according to claim 1, wherein said at least one pivot member is a pivot column having any one of a flat, spherical, ellipsoidal and chamfered cross section, each one adapted to allow pivotal movement between said load cell engaging member and said load transfer portion.

8. A load cell support structure according to claim 1, wherein said at least one biasing member is a compression spring.

9. A load cell support structure according to claim 1, wherein said pivot member is adapted to move relative to said load cell engaging member and/or relative to said load transfer member in a direction parallel to said upper surface.

10. A load cell support structure according to claim 9, wherein the movement of said pivot member is limited by a corresponding pivot member engaging recess provided in said load cell engaging member and/or load transfer member.

11. A load cell support structure according to claim 9, wherein the movement of said pivot member is limited by a stop provided on said load bearing member and adapted to stoppably engage with a portion of said base support member.

12. A load cell support structure according to claim 10, wherein the movement of said pivot member is limited by at least one stop member provided on said load bearing member and adapted to stoppably engage with a portion of said base support member.

13. A load cell scale having a load cell support structure comprising:
a base support member for mounting at least one load cell;
a load bearing member movable with respect to said base support member and having an upper surface for receiving a load;
a load cell engaging member adapted to operatively engage at least one load cell in a direction of a load applied to said upper surface of said load bearing member;
a load transfer portion integrally formed with said load bearing member and operatively coupled to said load cell engaging member so as to transfer a load from said upper surface to at least one load cell via said load cell engaging member;
at least one biasing member adapted to urge said load transfer member towards said load cell engaging member with a predetermined biasing force and in a direction opposing a load applied to said upper surface of said load bearing member;
at least one pivot member operatively engaging said load transfer member and said load cell engaging member, so as to allow pivotal movement of said load transfer member with respect to said load cell engaging member about said pivot member and in at least one plane parallel to the direction of a load applied to said upper surface, wherein the load cell support structure is configured such that deflection of the load bearing member downward due to loading reduces a load on the at least one pivot member.

14. A load cell scale according to claim 13, wherein said load cell support structure comprises a plurality of biasing members positioned about a centre point and in a symmetrical arrangement with respect to a centre axis of said upper surface within a region of said load transfer portion.

15. A load cell scale according to claim 13, wherein said load cell support structure comprises a plurality of pivot members positioned in a symmetrical arrangement about a centre point of said upper surface.

16. A load cell scale according to claim 14, wherein said load cell support structure comprises a plurality of pivot members positioned in a symmetrical arrangement about said centre point of said upper surface at a predetermined distance from said centre point.

17. A load cell scale according to claim 16, wherein the spatial arrangement of said plurality pivot members with respect to said centre point of said upper surface and with respect to any one of said plurality of biasing members determines a minimum load required at any position on said upper surface to overcome a biasing force provided by said at least one biasing member.

18. A load cell scale according to claim 13, said at least one pivot member is any one of a ball bearing, a pin, a chamfered surface and a rounded button, each one adapted to allow pivotal movement between said load cell engaging member and said load transfer portion.

19. A load cell scale according to claim 13, wherein said at least one pivot member is a pivot column having any one of a flat, spherical, ellipsoidal and chamfered cross section, each one adapted to allow pivotal movement between said load cell engaging member and said load transfer portion.

20. A load cell scale according to claim 13, wherein said at least one biasing member is a compression spring.

21. A load cell scale according to claim 13, wherein said pivot member is adapted to move relative to said load cell engaging member and/or relative to said load transfer member in a direction parallel to said upper surface.

22. A load cell scale according to claim 21, wherein the movement of said pivot member is limited by a corresponding pivot member engaging recess provided in said load cell engaging member and/or load transfer member.

23. A load cell support structure according to claim 21, wherein the movement of said pivot member is limited by a stop provided on said load bearing member and adapted to stoppably engage with a portion of said base support member.

24. A load cell support structure according to claim 22, wherein the movement of said pivot member is limited by at least one stop member provided on said load bearing member and adapted to stoppably engage with a portion of said base support member.

* * * * *